US012403072B1

(12) United States Patent
Chen

(10) Patent No.: US 12,403,072 B1
(45) Date of Patent: Sep. 2, 2025

(54) MEDICATION CONTAINER

(71) Applicant: AN GROUP LIMITED, Hong Kong (CN)

(72) Inventor: Junyuan Chen, Hong Kong (CN)

(73) Assignee: AN GROUP LIMITED, Hong Kong (CN)

( * ) Notice: Subject to any disclaimer, the term of this patent is extended or adjusted under 35 U.S.C. 154(b) by 0 days.

(21) Appl. No.: 19/212,742

(22) Filed: May 20, 2025

(30) Foreign Application Priority Data

Apr. 29, 2025 (CN) ......................... 202520845195.3

(51) Int. Cl.
*A61J 7/04* (2006.01)
*B65D 43/16* (2006.01)

(52) U.S. Cl.
CPC .............. *A61J 7/04* (2013.01); *B65D 43/163* (2013.01); *B65D 2543/00296* (2013.01)

(58) Field of Classification Search
CPC .... A61J 7/0481; A61J 7/04; A61J 1/03; A61J 1/1425; B65D 43/163; B65D 43/164
USPC ...................... 220/829, 264, 847, 827, 254.5
See application file for complete search history.

(56) References Cited

U.S. PATENT DOCUMENTS

| | | | | | |
|---|---|---|---|---|---|
| 2,483,304 | A * | 9/1949 | Vogel | A24F 15/12 | 220/264 |
| 6,257,431 | B1 * | 7/2001 | Baudin | B65D 47/0814 | 220/849 |
| 6,371,321 | B1 * | 4/2002 | Lee | B65D 43/22 | 220/23.6 |
| 7,624,890 | B2 * | 12/2009 | Noble | B65D 83/0445 | 206/538 |
| 12,139,305 | B2 * | 11/2024 | Leung | E05D 1/06 | |
| 2009/0166243 | A1 * | 7/2009 | Cetera | A61J 1/03 | 206/459.5 |
| 2022/0097949 | A1 * | 3/2022 | Miura | A47K 10/421 | |
| 2023/0202724 | A1 * | 6/2023 | Chen | B65D 43/164 | 220/263 |

* cited by examiner

*Primary Examiner* — Mollie Impink

(57) ABSTRACT

A medication container includes: a container body, with an accommodation chamber defined therein for receiving medication, wherein a slot is formed at a rear end of the accommodation chamber; and a lid, including a cover plate and an elastic soft rubber insert, wherein the elastic soft rubber insert is inserted into the slot, and a top end of the elastic soft rubber insert protrudes from the slot and is connected to a rear end of the cover plate, such that the cover plate is pivotally connected to the container body only via the elastic soft rubber insert; wherein the cover plate is engaged with an opening of the accommodation chamber by virtue of bending of the elastic soft rubber insert, and the elastic insert is deformed in response to being pulled by the rear end of the cover plate.

12 Claims, 7 Drawing Sheets

MEDICATION CONTAINER

CROSS-REFERENCE TO RELATED APPLICATIONS

This application claims priority to Chinese Patent Application No. 202520845195.3, filed with the Chinese Patent Office on Apr. 29, 2025, titled "MEDICATION CONTAINER", the entire contents of which are incorporated herein by reference.

TECHNICAL FIELD

The present disclosure relates to the technical field of storage apparatuses, and in particular, relates to a medication container.

BACKGROUND

To facilitate users in accessing medication, currently, most medication container lids are equipped with an automatic pop-up function. This automatic pop-up function is generally achieved by connecting a torsion spring at a pivot shaft where a lid and a container body are connected. For such configuration, during production and assembly of the medication container, the cost is relatively high and assembly steps are rather cumbersome due to a large number of components or parts.

SUMMARY

In view of the above problem, embodiments of the present disclosure provide a medication container. The medication container, while achieving automatic lid pop-up (or automatic lid ejection), simplifies the structure of the medication container structure, reduces the number of components or parts, and thereby lowers production costs and improves assembly efficiency.

According to one aspect of the embodiments of the present disclosure, a medication container is provided. The medication container includes: a container body, with an accommodation chamber defined therein for receiving medication, wherein a slot is formed at a rear end of the accommodation chamber; and a lid, including a cover plate and an elastic soft rubber insert, wherein the cover plate and the elastic soft rubber insert are integrally formed, the elastic soft rubber insert is inserted into the slot, and a top end of the elastic soft rubber insert protrudes from the slot and is connected to a rear end of the cover plate, such that the cover plate is pivotally connected to the container body only via the elastic soft rubber insert; wherein the cover plate is engaged with an opening of the accommodation chamber by virtue of bending of the elastic soft rubber insert and is then locked onto the container body, and the elastic insert is deformed in response to being pulled by the rear end of the cover plate; and in a case where the cover plate is unlocked from the container body, the elastic insert recovers from deformation and drives the cover plate to pivot to an open state.

In some embodiments, a first retaining portion is arranged on the elastic soft rubber insert, and a second retaining portion is arranged on an inner sidewall of the slot, wherein the second retaining portion is configured to be engaged with the first retaining portion after the elastic soft rubber insert is inserted into the slot, to restrict the elastic soft rubber insert from sliding outward.

In some embodiments, the first retaining portion includes a plurality of protrusions spaced apart on a rear side surface of the elastic soft rubber insert, and the second retaining portion includes a plurality of recesses spaced apart on a rear inner wall of the slot, wherein the plurality of protrusions and the plurality of recesses are engaged in one-to-one correspondence.

In some embodiments, the plurality of protrusions and the plurality of recesses are all spaced apart along a width direction of the elastic soft rubber insert.

In some embodiments, a width and a thickness of the elastic soft rubber insert are both equal to a width and a thickness of the cover plate.

In some embodiments, the elastic soft rubber insert is configured such that, in an initial state, the top end of the elastic soft rubber insert is bent backward, such that the elastic soft rubber insert is recoverable from deformation to drive the cover plate to pivot by a predetermined angle to be in the open state, wherein the predetermined angle is greater than 90°.

In some embodiments, the lid further includes a seal gasket, wherein the seal gasket is arranged on an inner surface of the cover plate, the seal gasket, the cover plate, and the elastic soft rubber insert form an integral structure, and the seal gasket is configured to abut against an opening edge of the accommodation chamber in a case where the cover plate is engaged with the opening of the accommodation chamber.

In some embodiments, the seal gasket is annular and adapted to the opening edge of the accommodation chamber in terms of shape.

In some embodiments, a front end of the cover plate extends curvedly to form an engagement plate, wherein an engagement portion is arranged on the engagement plate, and an elastic engagement member is arranged on a front end of the container body, wherein the elastic engagement member is configured to be engaged with the engagement portion in a case where the cover plate is engaged with the opening of the accommodation chamber, to lock the cover plate in the closed state.

In some embodiments, the medication container further includes a plurality of storage compartments arranged therein, wherein each of the storage compartments includes the container body and the lid.

In the medication container according to the embodiments of the present disclosure, the lid includes a cover plate and an elastic soft rubber insert that are integrally formed. The cover plate is configured to close or open the accommodation chamber in the container body. The elastic soft rubber insert is inserted into the slot of the container body, enabling the cover plate to pivot relative to the container body through the bending of the elastic soft rubber insert, such that the need for a pivot shaft for rotation between the cover plate and the container body is eliminated, and structural simplification is achieved. At the same time, by virtue of deformation recovery capabilities of the elastic soft rubber insert, the cover plate may automatically pop up after being unlocked, realizing an automatic pop-up lid function, such that users are facilitated in accessing medication within the accommodation chamber and user experience is ensured.

Furthermore, the medication container according to the embodiments of the present disclosure may, as a whole, consist of only two components or parts: the container body and the lid. A reduced number of components or parts is conducive to lowering production costs. Moreover, the assembly relationship between the container body and the lid is the insertion of the elastic soft rubber insert into the slot. Such an assembly method is easy to operate, such that the assembly difficulty of the medication container is reduced and the assembly efficiency is enhanced.

The above description only summarizes the technical solutions of the present disclosure. Specific embodiments of the present disclosure are described hereinafter to better and clearer understand the technical solutions of the present disclosure, to practice the technical solutions based on the disclosure of the specification, and to make the above and other objectives, features and advantages of the present disclosure more apparent and understandable.

BRIEF DESCRIPTION OF THE DRAWINGS

By reading the detailed description of preferred embodiments hereinafter, various other advantages and beneficial effects become clear and apparent for persons of ordinary skill in the art. The accompanying drawings are merely for illustrating the preferred embodiments, but shall not be construed as limiting the present disclosure. In all the accompanying drawings, like reference numerals denote like parts. In the drawings.

Figure 1:
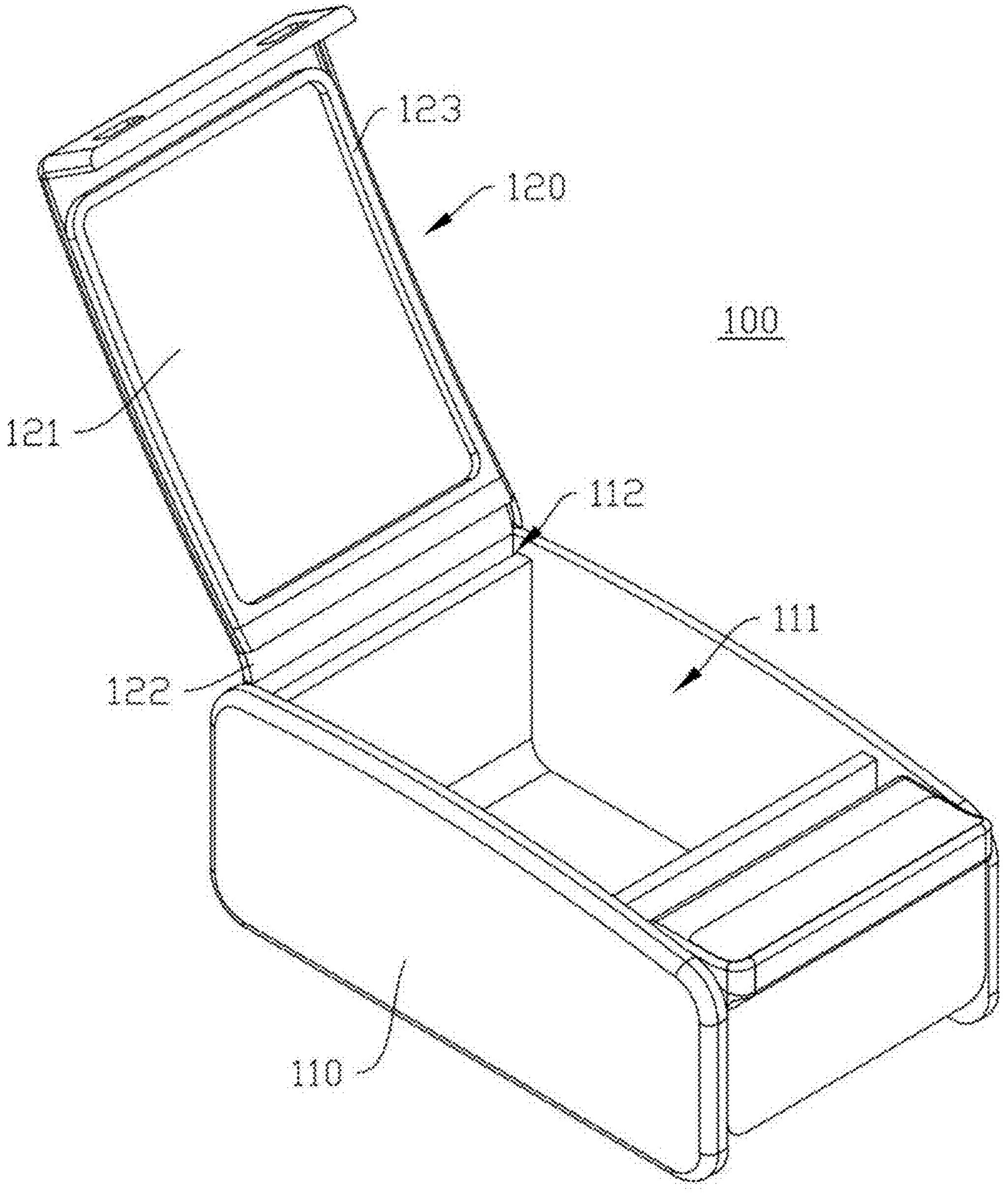
FIG. 1 is a schematic perspective view of a medication container in an open state according to some embodiments of the present disclosure.

Reference numerals in the embodiments and denotations thereof:

100-medication container; 101-storage compartment;

110-container body; 111-accommodation chamber; 112-slot; 1121-second retaining portion; 11211-recess; 113-elastic engagement member; 1131-support arm; 1132-press member; 11321-engagement protrusion;

120-lid; 121-cover plate; 122-elastic soft rubber insert; 1221-first retaining portion; 12211-protrusion; 1212-engagement plate; 12121-engagement portion; 12122-slot; 123-seal gasket.

DETAILED DESCRIPTION

The embodiments containing the technical solutions of the present disclosure are described in detail with reference to the accompanying drawings. The embodiments hereinafter are only used to clearly describe the technical solutions of the present disclosure. Therefore, these embodiments are only used as examples, but are not intended to limit the protection scope of the present disclosure.

Unless defined otherwise, all technical and scientific terms used herein have the same meaning as commonly understood by one of ordinary skill in the art to which the present disclosure pertains. The terms used herein in the specification of present disclosure are only intended to illustrate the specific embodiments of the present disclosure, instead of limiting the present disclosure. The terms "comprise," "include," and any variations thereof in the specification, claims, and the description of the drawings of the present disclosure are intended to cover a non-exclusive inclusion.

In the description of the present disclosure, the terms "first," "second," and the like are only used for distinguishing different objects, but shall not be understood as indication or implication of relative importance or implicit indication of the number of the specific technical features, the specific sequence or priorities. In the description of the embodiments of the present disclosure, the term "multiple" or "a plurality of" signifies at least two, unless otherwise specified.

The terms "example" and "embodiment" in this specification signify that the specific characteristic, structures or features described with reference to the embodiments may be covered in at least one embodiment of the present disclosure. This term, when appearing in various parts of the specification, neither indicates the same embodiment, nor indicates an independent or optional embodiment that is exclusive of the other embodiments. A person skilled in the art would implicitly or explicitly understand that the embodiments described in this specification may be incorporated with other embodiments.

In the description of the embodiments of the present disclosure, the term "and/or" is merely an association relationship for describing associated objects, which represents that there may exist three types of relationships. For example, the phrase "A and/or B" may indicate (A), (B), or (A and B). In addition, the forward-slash symbol "/" generally represents an "or" relationship between associated objects before and after the symbol.

In the description of the embodiments of the present disclosure, the term "multiple" or "a plurality of" signifies more than two (including two), unless otherwise specified. Likewise, the term "a plurality of groups" or "multiple groups" signifies more than two groups (including two groups), and the term "a plurality of pieces" or "multiple pieces" signifies more than two pieces (including two pieces).

In the description of the embodiments of the present disclosure, it should be understood that the terms "central," "transversal," "longitudinal," "length," "width," "thickness," "upper," "lower," "front," "rear," "left," "right," "vertical," "horizontal," "top," "bottom," "inner," "outer," "clockwise," "counterclockwise," "axial," "radial," "circumferential," and the like indicate orientations and position relationships which are based on the illustrations in the accompanying drawings, and these terms are merely for ease and brevity of the description, instead of indicating or implying that the devices or elements shall have a particular orientation and shall be structured and operated based on the particular orientation. Accordingly, these terms shall not be construed as limiting the present disclosure.

In the description of the embodiments of the present disclosure, it should be noted that unless otherwise specified and defined, the terms "mounted," "coupled," "connected," "secured," and derivative forms thereof shall be understood in a broad sense, which, for example, may be understood as secured connection, detachable connection or integral connection; may be understood as mechanical connection or electrical connection, or understood as direct connection, indirect connection via an intermediate medium, or communication between the interiors of two elements or interactions between two elements. Persons of ordinary skill in the art may understand the specific meanings of the above terms in the embodiments of the present disclosure according to the actual circumstances and contexts.

To achieve an automatic pop-up lid, in conventional medication containers, in addition to configuring a torsion spring on the pivot shaft, include some medication containers where, based on a pivotal connection between the lid and the container body via a pivot shaft, an elastic soft rubber strip is further arranged on an inner side of the pivotal connection between the lid and the container body, to achieve automatic lid opening by virtue of the elastic deformation of the elastic soft rubber strip.

Regardless of a torsion spring or an elastic soft rubber strip, during the production of the medication container, the torsion spring and the elastic soft rubber strip both need to be produced and processed separately. That is, the torsion spring or the elastic soft rubber strip is first prepared as an independent component or part and then assembled with the container body and the lid to form a complete medication container. This undoubtedly leads to a more complex structure for the medication container and a larger number of components or parts, consequently causing an increase in cost and assembly difficulty. Moreover, during assembly, the container body and the lid still need to be connected via a pivot shaft, which further leads to a decrease in assembly efficiency.

In view of the aforementioned problems, the present disclosure considers improving the medication container by reducing the number of components or parts and simplifying assembly steps, to achieve the objectives of cost reduction and ease of assembly. Through practical research, the present disclosure utilizes conventional processing technologies such as two-shot injection molding or dual-color injection molding to integrally form the cover plate and the elastic soft rubber insert from different materials to form the lid. Simultaneously, a slot is formed at the rear end of the accommodation chamber on the container body, and the lid is assembled with the container body by inserting the elastic soft rubber insert into the slot.

Based on this, the cover plate may pivot relative to the container body through the elastic deformation of the elastic soft rubber insert, thereby achieving the opening and closing of the cover plate. For such configuration, there is no need to configure a pivot shaft to rotatably connect the lid to the container body, such that the structure of the medication container is simplified and the assembly difficulty is reduced. At the same time, by virtue of the elastic recovery capabilities of the elastic soft rubber insert, the cover plate may automatically pivot and pop up in response to being opened, such that users are facilitated in accessing medication and user experience is ensured.

Figure 2:
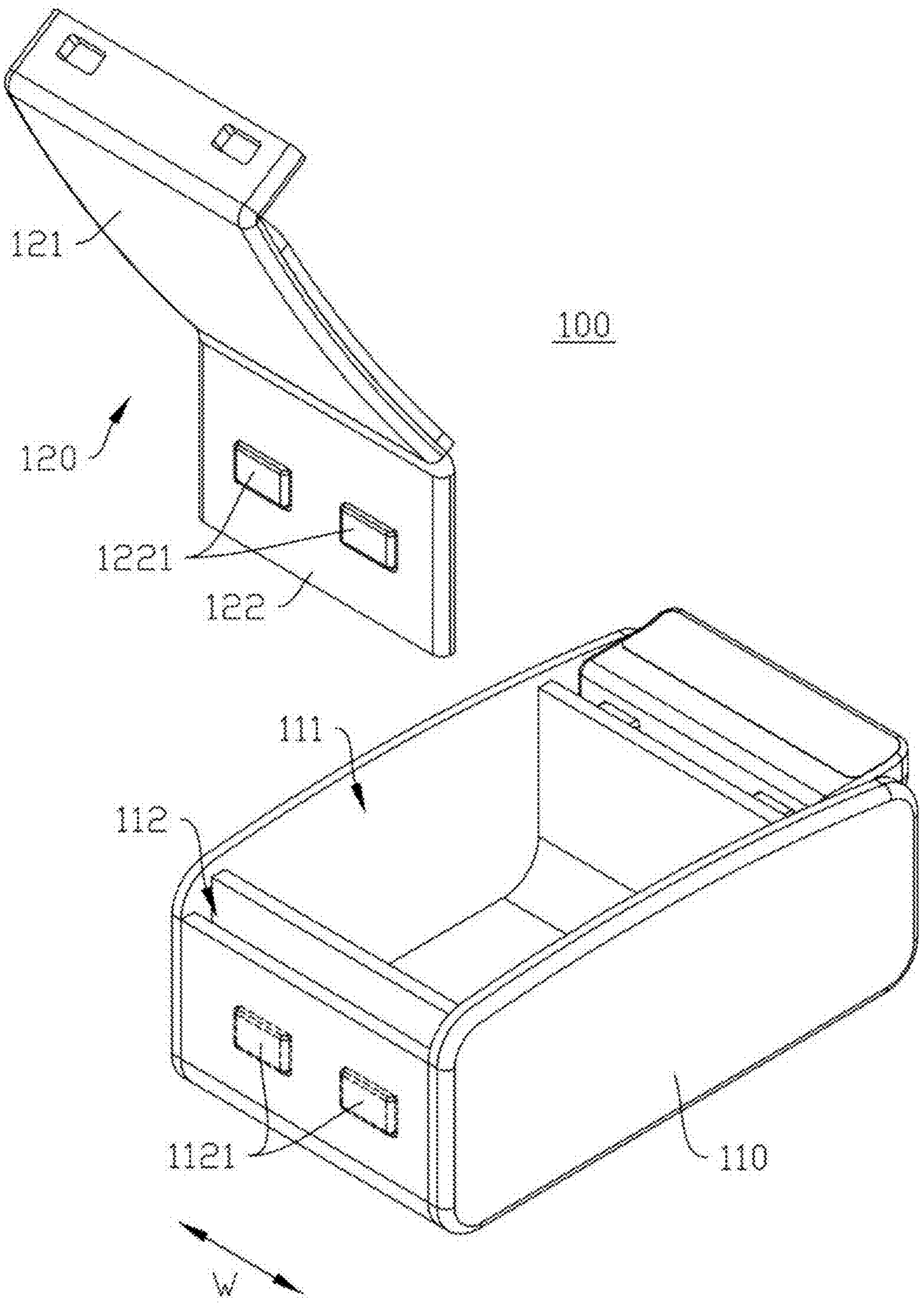
FIG. 2 is a schematic exploded view of a medication container in an open state according to some embodiments of the present disclosure.

First, referring to FIG. 1 and FIG. 2, which respectively illustrate a perspective view and an exploded view of a medication container 100 in an open state according to some embodiments of the present disclosure, the medication container 100 includes a container body 110 and a lid 120. The container body 110 defines an accommodation chamber 111 therein for receiving medication. At a rear end of the accommodation chamber 111, a slot 112 is also formed on the container body 110. The lid 120 includes a cover plate 121 and an elastic soft rubber insert 122. The cover plate 121 and the elastic soft rubber insert 122 are integrally formed. As previously described, the cover plate 121 and the elastic soft rubber insert 122 may be processed using existing injection molding techniques such as two-shot injection molding or dual-color injection molding to form an integral structure. The elastic soft rubber insert 122 is inserted into the slot 112. A top end of the elastic soft rubber insert 122 protrudes from the slot 112 and is connected to a rear end of the cover plate 121. This configuration allows the cover plate 121 to form a pivotal connection to the container body 110 via the elastic soft rubber insert 122. That is, the cover plate 121 may pivot relative to the container body 110 through the bending deformation of the elastic soft rubber insert 122, such that the opening and closing of the cover plate 121 is achieved.

The elastic soft rubber insert 122 may be made of silicone, rubber, silicone rubber, thermoplastic elastomer (TPE), thermoplastic polyurethane (TPU), thermoplastic copolyester (TPC) and polyvinyl chloride (PVC), or the like.

Figure 3:
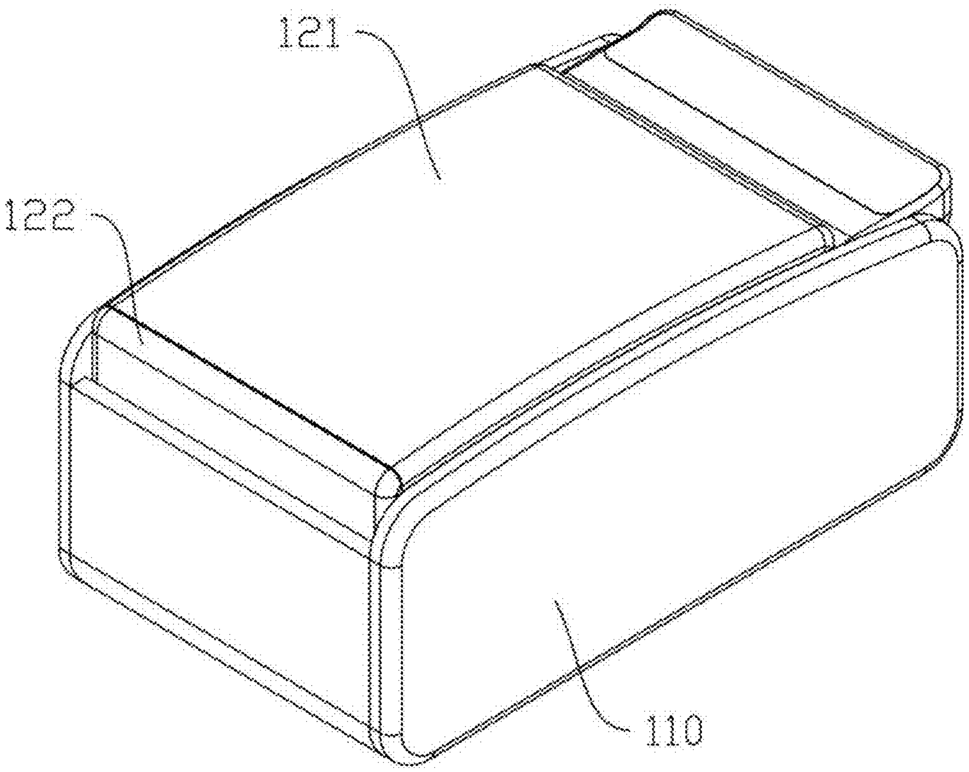
FIG. 3 is a schematic perspective view of a medication container in a closed state according to some embodiments of the present disclosure.

As illustrated in FIG. 3, which illustrates a perspective view of the medication container in a closed state, the cover plate 121 may, through the bending of the elastic soft rubber insert 122, be engaged with an opening of the accommodation chamber 111. Upon engagement, the cover plate 121 may be locked onto the container body 110 by means such as latching or locking, to maintain a sealed protection for the accommodation chamber 111 and achieve reliable storage of medication within the accommodation chamber 111. In a case where the cover plate 121 is unlocked, the elastic soft rubber insert 122 automatically recovers from deformation. During the process of recovering from deformation, the elastic soft rubber insert 122 drives the cover plate 121, via its top end, to pivot to an open state.

Figure 4:
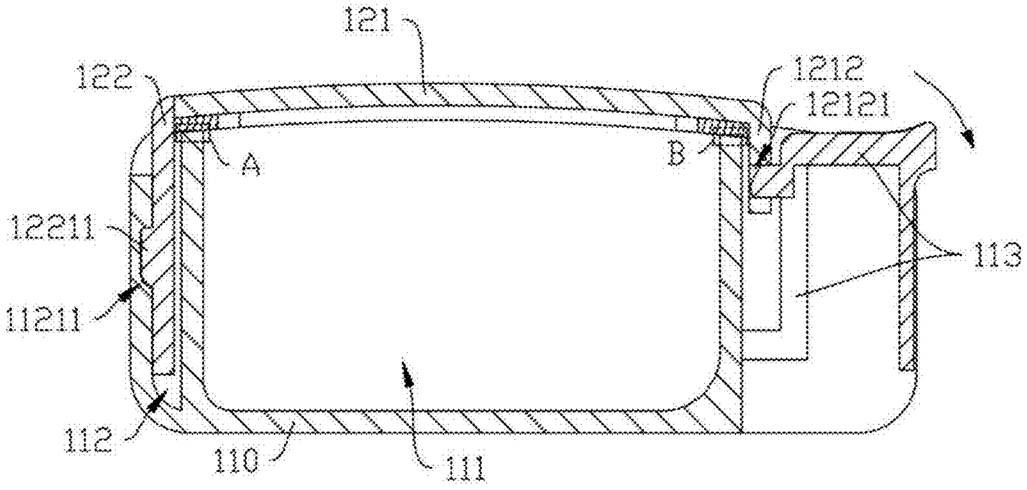
FIG. 4 is a schematic cross-sectional view of a medication container in a closed state according to some embodiments of the present disclosure.
Figure 5:
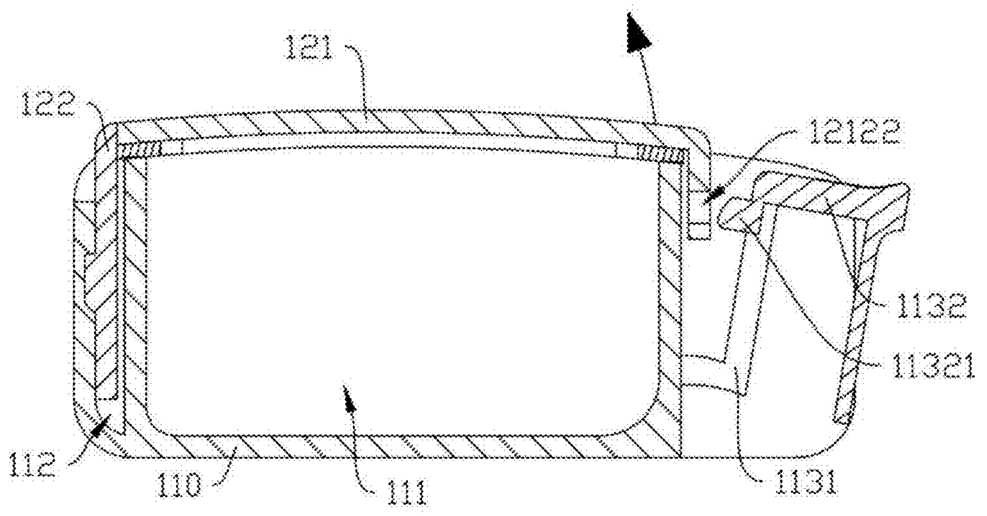
FIG. 5 is a schematic cross-sectional view of a medication container with a cover plate thereof being in an unlocked state according to some embodiments of the present disclosure.
Figure 6:
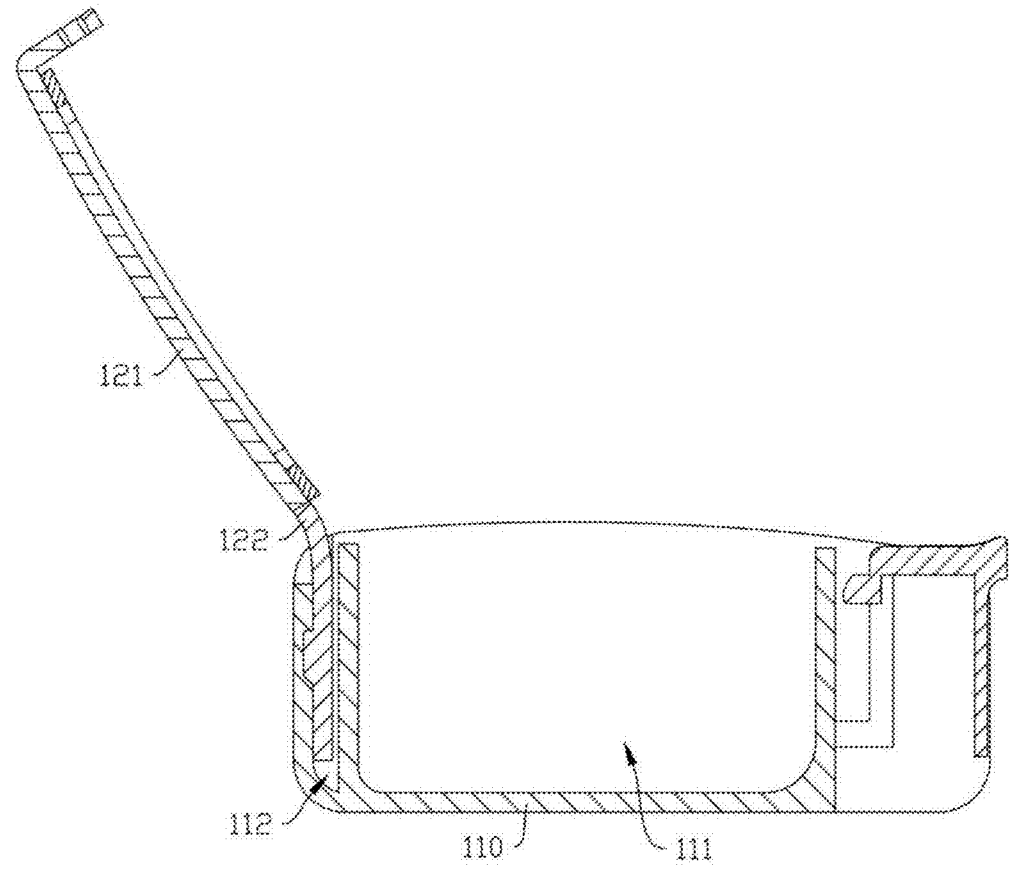
FIG. 6 is a schematic cross-sectional view of a medication container in an open state according to some embodiments of the present disclosure.

Specifically, referring to FIG. 4 to FIG. 6, which respectively show cross-sectional views of the cover plate 121 in three states during the process of pivoting from a closed state to an open state, driven by the elastic soft rubber insert 122. In the state illustrated in FIG. 4, the cover plate 121 is locked onto the container body 110, and at this time, the cover plate 121 remains in the closed state. On this basis, in a case where the cover plate 121 is unlocked as illustrated in FIG. 5, the cover plate 121, under an elastic force of the elastic soft rubber insert 122, may pivot in the direction indicated by the arrow in FIG. 5, achieving an automatic pop-up lid function. After the cover plate 121 pivots to the open state, a state illustrated in FIG. 6 is presented. In this state, the cover plate 121 is maintained under a support effect of the elastic soft rubber insert 122.

In the medication container 100 according to the embodiments of the present disclosure, the lid 120 includes a cover plate 121 and an elastic soft rubber insert 122 that are integrally formed. The cover plate 121 is responsible for closing and opening the accommodation chamber 111 on the container body 110. The elastic soft rubber insert 122 is inserted into the slot 112 in the container body 110, such that the cover plate 121 may pivot relative to the container body 110 through the deformation and recovery from deformation of the elastic soft rubber insert 122. In a case where the cover plate 121 is in the closed state, the cover plate 121 is engaged with the opening of the accommodation chamber 111 and is locked onto the container body 110, and the elastic soft rubber insert 122 is deformed in response to being pulled by the rear end of the cover plate 121. In a case where the cover plate 121 is unlocked from the container body 110, the elastic soft rubber insert 122 recovers from deformation and drives the cover plate 121 to pivot to the open state.

Through the above-described manner, the pivot shaft required for rotation between the cover plate 121 and the container body 110 may be eliminated, achieving the purposes of structural simplification and improved space utilization. At the same time, by virtue of deformation recovery capabilities of the elastic soft rubber insert 122, the cover plate 121 may automatically pop up after being unlocked, realizing an automatic pop-up lid function, such that users are facilitated in accessing medication within the accommodation chamber 111 and user experience is ensured.

Furthermore, the medication container 100 according to the embodiments of the present disclosure may, as a whole, consist of only two components or parts: the container body 110 and the lid 120. A reduced number of components or parts is conducive to lowering production costs. Moreover, the assembly relationship between the container body 110 and the lid 120 is the insertion of the elastic soft rubber insert 122 into the slot 112. Such an assembly method is easy to operate, such that the assembly difficulty of the medication container 100 is reduced and the assembly efficiency is enhanced.

To ensure the stability of the assembly connection between the lid 120 and the container body 110, the present disclosure further provides a reinforced design for the connection of the elastic soft rubber insert 122 in the slot 112. Specifically, still referring to FIG. 2, which also illustrates a perspective view of an inner wall of the slot 112 in the medication container 100. As illustrated in the FIG. 2, a first retaining portion 1221 is arranged on the elastic soft rubber insert 122, and a second retaining portion 1121 is arranged on an inner side wall of the slot 112. After the elastic soft rubber insert 122 is inserted into the slot 112, the second retaining portion 1121 and the first retaining portion 1221 are engaged with each other, such that the outward sliding of the elastic soft rubber insert 122 is restricted and the elastic soft rubber insert 122 is ensured to be securely connected within the slot 112.

Specifically, still referring to FIG. 2 and in further combination with FIG. 3, the first retaining portion 1221 may include a plurality of protrusions 12211 spaced apart on a rear side surface of the elastic soft rubber insert 122, and the second retaining portion 1121 includes a plurality of recesses 11211 spaced apart on a rear inner wall of the slot 112, wherein the plurality of protrusions 12211 and the plurality of recesses 11211 are engaged in one-to-one correspondence. In the embodiments, by engagement between the plurality of spaced protrusions 12211 with the plurality of spaced recesses 11211, the container body 110 forms a limit on the elastic soft rubber insert 122 at multiple points. This ensures that when the elastic soft rubber insert 122 recovers from elastic deformation and drives the cover plate 121 to pivot to the open state, the elastic soft rubber insert 122 may not be disengaged from the slot 112 due to an inertial force of the cover plate 121.

As illustrated in FIG. 2, the plurality of protrusions 12211 may be spaced apart along a width direction of the elastic soft rubber insert 122 (the direction indicated by the double-head arrow W in FIG. 2). This allows the elastic soft rubber insert 122 to be retained at a plurality of positions in the width direction, such that the elastic soft rubber insert 122, in response to being inserted and fixed in the slot 112, is less prone to tilting, and thus the closing of the cover plate 121 is not affected.

It is understandable that, for the assembly and fixing of the elastic soft rubber insert 122 in the slot 112, in addition to the engagement between the first retaining portion 1221 and the second retaining portion 1121, methods such as interference fit or adhesion may also be employed.

Figure 7:
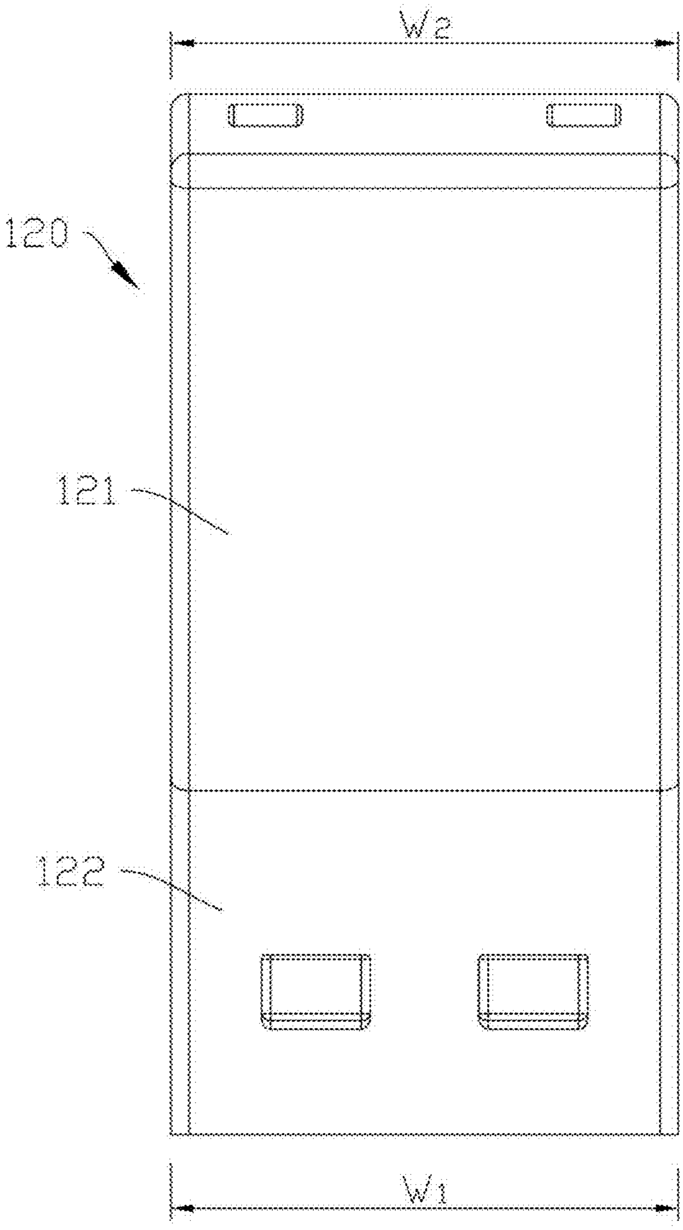
FIG. 7 is a schematic rear view of a lid of a medication container according to some embodiments of the present disclosure.
Figure 8:
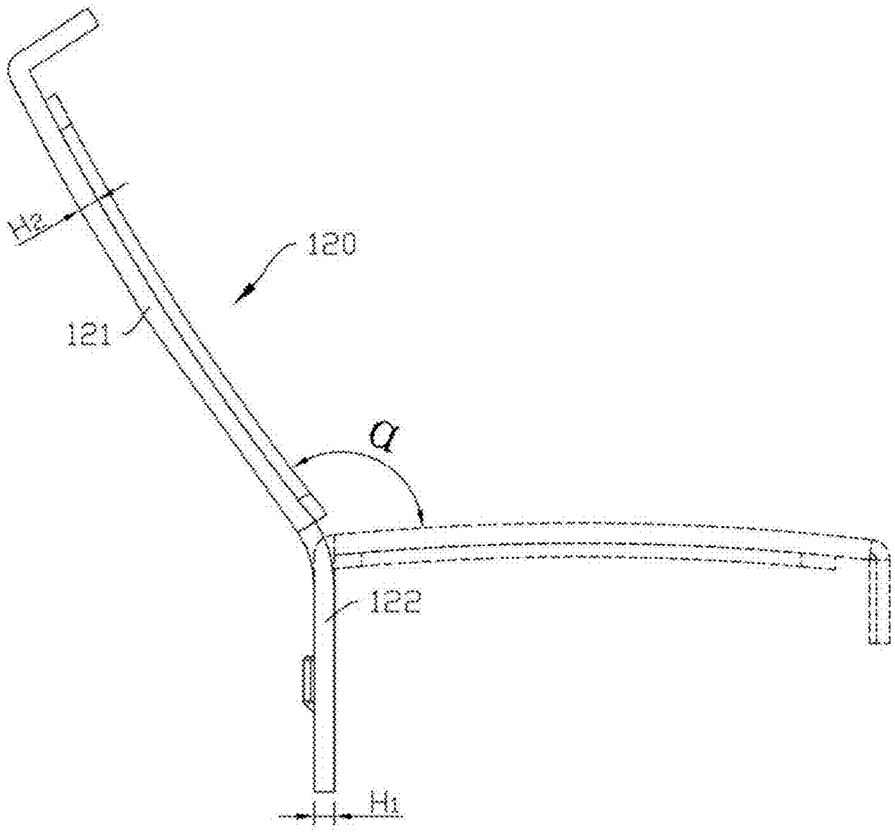
FIG. 8 is a schematic side view of a lid of a medication container according to some embodiments of the present disclosure.

Referring to FIG. 7 which illustrates a rear view of the lid 120 and FIG. 8 which illustrates a side view of the lid, a width W1 of the elastic soft rubber insert 122 may be set equal to a width W2 of the cover plate 121, and a thickness H1 of the elastic soft rubber insert 122 may also be set equal to a thickness H2 of the cover plate 121. This configuration, while ensuring the overall flatness and aesthetic appeal of the lid 120, also ensures that in a case where the elastic soft rubber insert 122 drives the cover plate 121 to pivot from its rear end, the rear end of the cover plate 121 experiences a uniform force along the width direction (i.e., the direction indicated by the double arrow W in FIG. 2). This, in turn, ensures that the cover plate 121 pivots smoothly to the open state without tilting, wobbling, or similar issues.

To ensure that users may more easily access medication in the accommodation chamber 111 after the cover plate 121 is opened, as illustrated in FIG. 8, the dashed line portion in FIG. 8 represents the lid 120 in the closed state, and the solid line portion represents the lid 120 in the open state. In an initial state, as illustrated by the solid line portion in FIG. 8, i.e., in an undeformed default state, the top end of the elastic soft rubber insert 122 is bent rearward (in the leftward direction as illustrated in FIG. 8). This allows the elastic soft rubber insert 122, after the cover plate 121 is unlocked, to drive the cover plate 121 to pivot by a predetermined angle α greater than 90° from the closed state (illustrated by the dashed line portion) to the open state (illustrated by the solid line portion), and ultimately maintain the cover plate 121 in the open state.

In a deformed state as illustrated in FIG. 8, the top end of the elastic soft rubber insert 122 is upright. Furthermore, in the deformed state, the elastic soft rubber insert 122 may also be pulled by the rear end of the cover plate 121 to be slightly bent forward (in the rightward direction as illustrated in FIG. 8).

Still referring to FIG. 1, in a case where the cover plate 121 pivots by the predetermined angle α, the opening of the accommodation chamber 111 may be fully exposed, such that it is more convenient for the user to reach, with hands, into the accommodation chamber 111 to access medication. In the embodiments illustrated in the accompanying drawings, the predetermined angle α is 120°. In some other embodiments, the predetermined angle α may also be any angle greater than 90°, which is not specifically limited herein.

Moreover, since the top of the elastic soft rubber insert 122 is bent rearward in its initial state, even after long-term use, even though the elastic soft rubber insert 122 fails to fully recover to its initial state due to increased fatigue, the elastic soft rubber insert 122 still ensures that the cover plate 121 pivots to the open state by a large angle, such that the service life of the medication container 100 is extended.

To better store medication and prevent the medication from becoming damp and ineffective, as illustrated in FIG. 1, the lid 120 may also include a seal gasket 123. The seal gasket 123 is arranged on an inner surface of the cover plate 121, and the seal gasket 123, the cover plate 121, and the elastic soft rubber insert 122 form an integral structure. This avoids additionally increasing the number of components or parts and affecting assembly efficiency. Similarly to what has been described earlier, the seal gasket 123, the cover plate 121, and the elastic soft rubber insert 122 may be integrally formed using conventional processes such as tri-color injection molding. To simplify the production process and reduce costs, the seal gasket 123 and the elastic soft rubber insert 122 may be made of the same material. On this basis, the lid 120 may then be manufactured using simpler dual-color injection molding or two-shot injection molding.

As illustrated in FIG. 4, in a case where the cover plate 121 is engaged with the opening of the accommodation chamber 111, the seal gasket 123 is abutted against the opening edge of the accommodation chamber 111 (regions A and B outlined in FIG. 4), to achieve sealed protection for the accommodation chamber 111 and ensure that the medication stored inside is less prone to becoming damp and ineffective.

Still referring to FIG. 1, the seal gasket 123 may be annularly arranged and adapted to the opening edge of the accommodation chamber 111 in terms of shape, to provide better sealing for the accommodation chamber 111.

Figure 9:
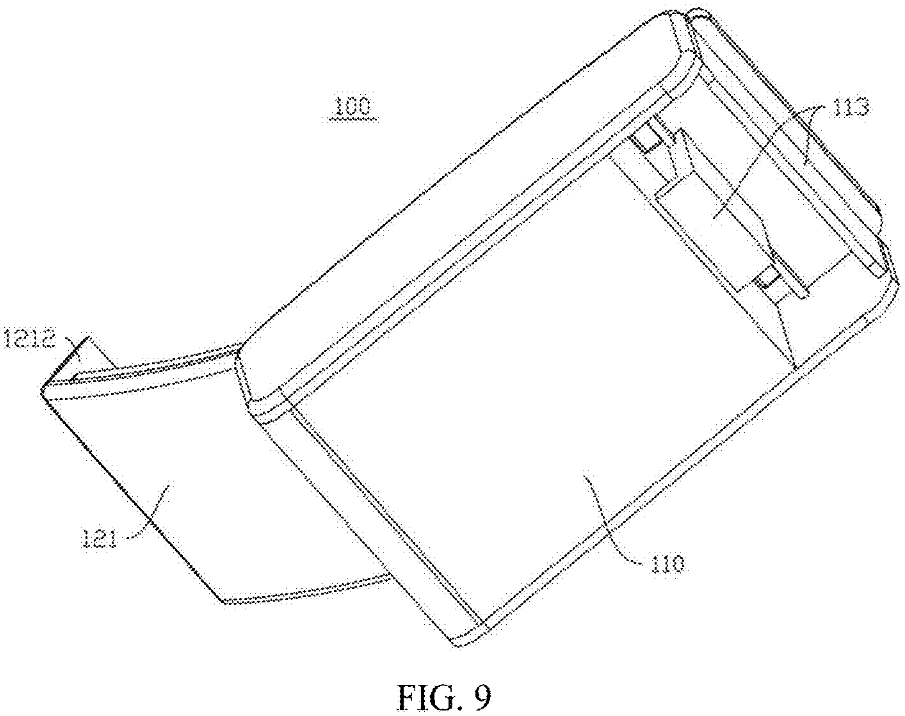
FIG. 9 is a schematic perspective view of a bottom of a medication container according to some embodiments of the present disclosure.

Regarding the locking of the cover plate 121 onto the container body 110, the present disclosure proposes an embodiment. Specifically, referring to FIG. 4 and FIG. 9, FIG. 9 illustrates a perspective view of the medication container 100 from a bottom angle. In this embodiment, a front end of the cover plate 121 extends completely to form an engagement plate 1212, an engagement portion 12121 is arranged on the engagement plate 1212, and an elastic engagement member 113 is arranged on a front end of the container body 110. In a case where the cover plate 121 is engaged with the opening of the accommodation chamber 111, the elastic engagement member 113 is engaged with the engagement portion 12121 to lock the cover plate 121 in the closed state.

Specifically, as illustrated in FIG. 4 to FIG. 6, the engagement portion 12121 may be an engagement recess 12122 formed in the engagement plate 1212. The elastic engagement member 113 includes a deformably bendable support arm 1131 having a bottom end fixed to a front side of the container body 110, and a press member 1132 fixed to a top end of the support arm 1131, wherein an engagement protrusion 11321 is arranged on the press member 1132.

As illustrated in FIG. 4, after the cover plate 121 is engaged with the opening of the accommodation chamber 111, the engagement protrusion 11321 is engaged within the engagement recess 12122 to lock the cover plate 121 in the closed state. Based on the state illustrated in FIG. 4, in a case where the press member 1132 is pressed downward in the direction indicated by the arrow in the FIG. 4, the support arm 1131 bends and deforms, causing the engagement protrusion 11321 to move out of the engagement groove 12122, and presenting the state illustrated in FIG. 5. At this time, the cover plate 121 is unlocked. Subsequently, the cover plate 121, under the elastic force of the elastic soft rubber insert 122, may automatically pivot and pop up in the direction indicated by the arrow in FIG. 5 to the open state illustrated in FIG. 6.

Figure 10:
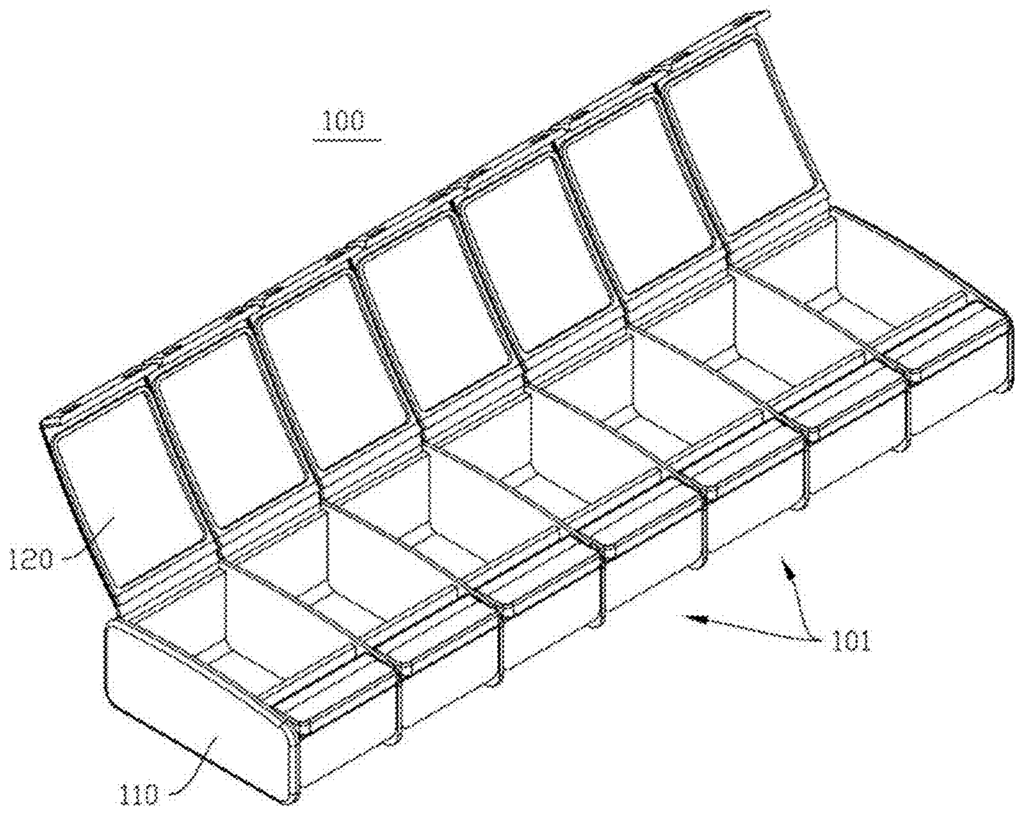
FIG. 10 is a schematic perspective view of a medication container according to some embodiments of the present disclosure.

Considering that medication intake is generally periodic, to enable users to better distinguish medication required for different time periods, as illustrated in FIG. 10, the medication container 100 may include a plurality of storage compartments 101 arranged therein. Each storage compartment 101 includes the container body 110 and the lid 120. Specifically, seven storage compartments 101 may be provided as illustrated in FIG. 10, with each storage compartment 101 used for storing medication required for one day. The entire medication container 100 may store medication for one week dose. Additionally, for situations where medication needs to be taken three times a day, three storage compartments 101 may also be provided, each for storing the medication required for each dose. For other situations, the storage compartments 101 may also be arranged in other quantities, which is not specifically limited herein.

It should be finally noted that the above-described embodiments are merely for illustration of the present disclosure, but are not intended to limit the present disclosure. Although the present disclosure is described in detail with reference to these embodiments, a person skilled in the art may also make various modifications to the technical solutions disclosed in the embodiments, or make equivalent replacements to a part of or all technical features contained therein. Such modifications or replacement, made without departing from the principles of the present disclosure, shall fall within the scope of the present disclosure. Especially, various technical features mentioned in various embodiments may be combined in any fashion as long as there is no structural conflict.

What is claimed is:

1. A medication container, comprising:

a container body, with an accommodation chamber defined therein for receiving medication, wherein a slot is formed at a rear end of the accommodation chamber; and a lid, comprising a cover plate and an elastic insert, wherein the elastic insert is made of a material selected from the group consisting of silicone, rubber, silicone rubber, thermoplastic elastomer (TPE), thermoplastic polyurethane (TPU), thermoplastic copolyester (TPC) and polyvinyl chloride (PVC), the cover plate and the elastic insert are integrally formed, the elastic insert is inserted into the slot, a top end of the elastic insert protrudes from the slot and is connected to a rear end of the cover plate, and the cover plate is pivotally connected to the container body only via the elastic insert;

wherein in a case where the cover plate is in a closed state, the cover plate is engaged with an opening of the accommodation chamber and is locked onto the container body, and the elastic insert is deformed in response to being pulled by the rear end of the cover plate; and in a case where the cover plate is unlocked from the container body, the elastic insert recovers from deformation and drives the cover plate to pivot to an open state.

2. The medication container according to claim 1, wherein a first retaining portion is arranged on the elastic insert, and a second retaining portion is arranged on an inner sidewall of the slot, wherein the second retaining portion is configured to be engaged with the first retaining portion after the elastic insert is inserted into the slot, to restrict the elastic insert from sliding outward.

3. The medication container according to claim 2, wherein the first retaining portion comprises a plurality of protrusions spaced apart on a rear side surface of the elastic insert, and the second retaining portion comprises a plurality of recesses spaced apart on a rear inner wall of the slot, wherein the plurality of protrusions and the plurality of recesses are engaged in one-to-one correspondence.

4. The medication container according to claim 3, wherein the plurality of protrusions and the plurality of recesses are all spaced apart along a width direction of the elastic insert.

5. The medication container according to claim 1, wherein a width and a thickness of the elastic insert are both equal to a width and a thickness of the cover plate.

6. The medication container according to claim 1, wherein the elastic insert is configured such that, in an initial state, the top end of the elastic insert is bent towards a side facing away from the accommodation chamber, such that the elastic insert is recoverable from deformation to drive the cover plate to pivot by a predetermined angle to be in the open state, wherein the predetermined angle is greater than 90°.

7. The medication container according to claim 6, wherein that the elastic insert is configured such that, in the initial state, the top end of the elastic insert is bent by a first angle towards the side facing away from the accommodation chamber, wherein the first angle is 30°, such that the predetermined angle is 120°.

8. The medication container according to claim 1, wherein the lid further comprises a seal gasket, wherein the seal gasket is arranged on an inner surface of the cover plate, the seal gasket, the cover plate, and the elastic insert form an integral structure, and the seal gasket is configured to abut against an opening edge of the accommodation chamber in a case where the cover plate is engaged with the opening of the accommodation chamber.

9. The medication container according to claim 8, wherein the seal gasket is annular and adapted to the opening edge of the accommodation chamber in terms of shape.

10. The medication container according to claim 1, wherein a front end of the cover plate extends curvedly to form an engagement plate, wherein an engagement portion is arranged on the engagement plate, and an elastic engagement member is arranged on a front end of the container body, wherein the elastic engagement member is configured to be engaged with the engagement portion in a case where the cover plate is engaged with the opening of the accommodation chamber, to lock the cover plate in the closed state.

11. The medication container according to claim 10, wherein the engagement portion is an engagement recess formed in the engagement plate, and the elastic engagement member comprises a support arm having a bottom end fixed to a front side of the container body and being deformably bendable, and a press member fixed to a top end of the support arm, wherein an engagement protrusion is disposed on the press member, and in the case where the cover plate is engaged with the opening of the accommodation chamber, the engagement protrusion is engaged within the engagement recess to lock the cover plate in the closed state.

12. The medication container according to claim 1, further comprising: a plurality of storage compartments arranged therein, wherein each of the storage compartments comprises the container body and the lid.

* * * * *